United States Patent
Schulz et al.

(10) Patent No.: US 10,496,573 B2
(45) Date of Patent: Dec. 3, 2019

(54) CONTEXT-SENSITIVE INTERRUPTS

(71) Applicant: INTEL CORPORATION, Santa Clara, CA (US)

(72) Inventors: Steffen Schulz, Darmstadt (DE); Patrick Koeberl, Alsbach-Haenlein (DE); Vedvyas Shanbhogue, Austin, TX (US); Jason W. Brandt, Austin, TX (US); Venkateswara R. Madduri, Austin, TX (US); Sang W. Kim, Austin, TX (US); Julien Carreno, Ennis (IE)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 15/476,001

(22) Filed: Mar. 31, 2017

(65) Prior Publication Data
US 2018/0285291 A1 Oct. 4, 2018

(51) Int. Cl.
*G06F 13/24* (2006.01)
*G06F 13/00* (2006.01)

(52) U.S. Cl.
CPC .................. *G06F 13/24* (2013.01)

(58) Field of Classification Search
CPC ................ G06F 13/24; G06F 13/00
USPC ....................................... 710/267
See application file for complete search history.

(56) References Cited

U.S. PATENT DOCUMENTS

| | | | | |
|---|---|---|---|---|
| 5,305,455 A | * | 4/1994 | Anschuetz | G06F 9/4812 710/200 |
| 6,401,155 B1 | * | 6/2002 | Saville | G06F 9/462 710/266 |
| 6,408,386 B1 | * | 6/2002 | Hammond | G06F 9/30181 710/269 |
| 8,424,013 B1 | * | 4/2013 | Chalmer | G06F 9/4812 712/244 |
| 2005/0172294 A1 | * | 8/2005 | Kanemura | G06F 9/441 718/107 |
| 2006/0190945 A1 | * | 8/2006 | Kissell | G06F 9/3851 718/108 |
| 2007/0260796 A1 | * | 11/2007 | Grossman | G06F 13/24 710/269 |
| 2008/0244114 A1 | * | 10/2008 | Schluessler | G06F 13/28 710/24 |
| 2010/0313061 A1 | * | 12/2010 | Huth | G06F 11/073 714/2 |
| 2013/0174148 A1 | * | 7/2013 | Amit | G06F 9/45558 718/1 |

(Continued)

OTHER PUBLICATIONS

Patrick Koeberl et al., "Lightweight Trusted Task", U.S. Appl. No. 15/384,267, filed Dec. 19, 2016, 67 pages.

(Continued)

*Primary Examiner* — Christopher B Shin
(74) *Attorney, Agent, or Firm* — Schwabe, Williamson & Wyatt, P.C.

(57) ABSTRACT

Methods, apparatus, and system to create interrupts which are resolved at runtime relative to an active compartment. Active compartments may be, for example, a compartment of an operating system ("OS") or a trusted execution environment ("TEE"). The context-specific interrupts comprise an interrupt dispatch table ("IDT") for each compartment.

25 Claims, 3 Drawing Sheets

(56) References Cited

U.S. PATENT DOCUMENTS

2015/0019847 A1\* 1/2015 Catherwood ........... G06F 9/462
                                                                712/229
2016/0224399 A1\* 8/2016 Zheng .................... G06F 9/468
2016/0283402 A1    9/2016 Schulz et al.
2016/0303752 A1   10/2016 Hilliard et al.
2018/0157603 A1    6/2018 Schulz et al.

OTHER PUBLICATIONS

Office Action dated Jun. 6, 2019 for U.S. Appl. No. 15/384,267; 16 pages.

\* cited by examiner

CONTEXT-SENSITIVE INTERRUPTS

FIELD

The present disclosure relates to computing, in particular to, interrupts sensitive to a context.

BACKGROUND

An important feature of trusted execution environments ("TEEs") is an ability to interrupt an application executed by the TEE in a timely and secure manner for handling hardware or software interrupt events. In many cases, an interrupt event is handled by a non-trusted OS compartment, in which case a special hardware path may be used to securely store and exit the TEE (e.g. INTEL® Software Guard Extensions, "SGX", Asynchronous Exit).

Some solutions handle interrupt events in a TEE, by making the hardware enter a special "secure mode" upon the occurrence of particular interrupts, e.g. INTEL® Secure Management Mode ("SMM") and INTEL® System Management Interrupt ("SMI"), or ARM® TRUSTZONE® secure interrupt into TRUSTZONE® Monitor.

These, however, require dispatch by a common trusted runtime, such as the TRUSTZONE® Monitor or INTEL® SMM, which introduces processing time inefficiencies, context switch overhead, and security problems. For example, context switch may be unnecessary when the system is already in a correct compartment. For example, security problems can arise when a TEE is controlled by multiple and/or distributed stakeholders.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a "process" corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein, a "compartment" is a memory and execution region in a computer device, wherein the memory and execution region provides security features such as isolated execution, integrity of process(es) executed in the memory and execution region, and confidentiality of data in the memory and execution region; the isolated memory region may be of an operating system, a trusted execution environment, or a process, application, or task of either. Compartments may be understood of as containing or executing Intel Architecture ("IA") task(s). An example of a compartment is an "enclave" under INTEL® SGX, which allow user-level code to occupy private regions of memory, an "enclave", that is protected from other user-level code as well as from processes running at higher or different privilege levels (including from firmware).

As used herein, a "handler" or "interrupt handler" is an interrupt service routine. An "interrupt gate" or "gate" (as used herein) may be an entry which directs to a handler. In legacy approaches, interrupt gates were placed in an interrupt dispatch table or interrupt descriptor table ("IDT"), which was walked in response to interrupt signals. As described herein, handlers or interrupt service routines may be referenced by entries in context-sensitive local descriptor tables.

As used herein, an "interrupt service routine" is a callback in microcontroller firmware, an operating system, or a device driver triggered by interrupt signals received by, for example, a hardware exception unit (as in the case of hardware signals) or by an operating system or kernel (as in the case of software interrupts). As noted, in legacy approaches, interrupt signals trigger walking of an IDT and generate interrupt requests leading to interrupt service routines.

As used herein, a "task state segment" ("TSS") is a structure (e.g., in INTEL® x86-based computers), which holds information about a task and is used by an operating system and/or kernel for task management. A TSS may store the following information: processor register state, I/O port permissions, inner-level stack pointers, and previous TSS link.

As used herein, a "callback" is an execution transfer that is directly or indirectly (via a reference) passed as an argument to other code, where the other code is expected to execute the argument at a given time. The other code may also return the results of the execution.

As used herein, a "call gate" is a mechanism (e.g., in Intel Corporation's x86 architecture) for transferring execution control that may include a change of the privilege level of a process, such as by execution of a "call far" or "far call" instruction.

In overview, this disclosure relates to methods and systems in a computer device apparatus to create interrupts which are resolved at runtime relative to an active compartment. Active compartments may be, for example, a compartment of an operating system ("OS") or a trusted execution environment ("TEE"). The interrupts are created by a context-specific interrupt instantiation module, illustrated, by way of example, in FIG. 3 as context-specific interrupt instantiation module 300. For each compartment, the context-specific interrupt instantiation module may create gate entries in an interrupt dispatch table ("IDT"), which gates point to a context-specific local descriptor table ("LDT"), wherein the context-specific LDT comprises or further leads to interrupt service routine ("ISR") code and data of the interrupt, resulting in interrupts which are context-specific for each compartment.

In a first example of an embodiment of a context-specific interrupt, the context-specific interrupt instantiation module creates IDT gates which point to an LDT of a compartment. The context-specific interrupt instantiation module also creates entries in the LDT, specific to the context of the compartment. The context-specific interrupt instantiation module may program the LDT record with a memory segment descriptor, wherein the memory segment descriptor identifies an interrupt service routine ("ISR") code and data of the interrupt. The context-specific interrupt instantiation module may create a plurality of interrupts, wherein at least two of the plurality of interrupts comprise memory segment descriptors, wherein the memory segment descriptors point to a common memory location, wherein the common memory location comprises the ISR code and data of the interrupt and wherein the common memory location is protected by a write access protection.

In a second example of an embodiment of a context-specific interrupt, the context-specific interrupt instantiation module may create an interrupt gate entry in the IDT and program the interrupt gate entry to invoke an LDT record with a call to an ISR of an operating system. The context-specific interrupt instantiation module may program the interrupt gate entry to load an interrupt signal into a shared memory segment, and activate the LDT record with the call to the ISR of the operating system using a far call. The far call may comprise a task state segment ("TSS") comprising an access and permissions of the ISR of the operating system and with a startup state to cause a processor to inspect the interrupt signal in the shared memory in conjunction with the call to the ISR of the operating system. The TSS may be a nested task, wherein an interrupt return of the ISR of the operating system is to cause a return to the compartment memory, wherein the compartment memory may be of an application for a TEE.

Figure 1:
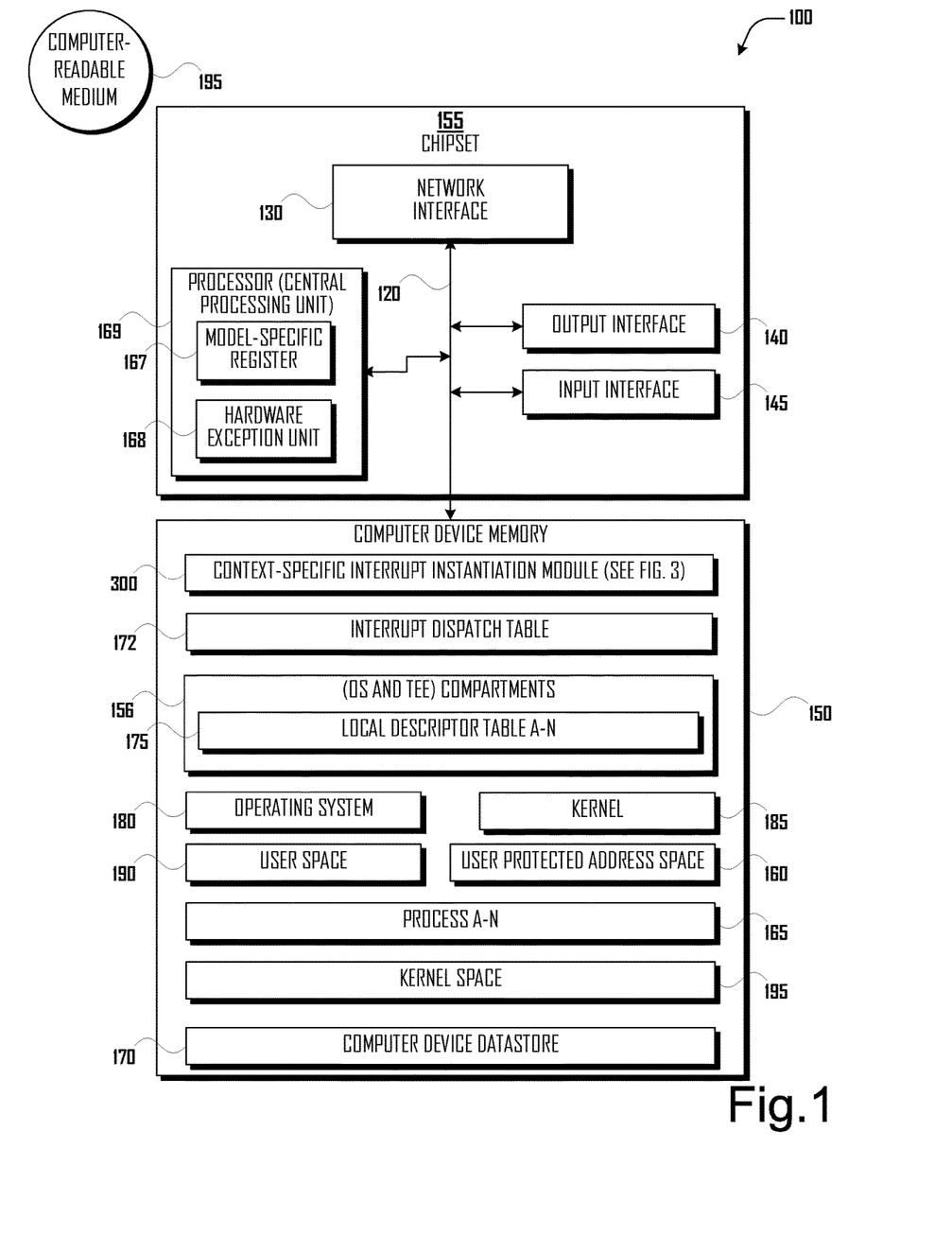
FIG. 1 is a block diagram illustrating an example of a computer device incorporated with teachings of the present disclosure, according to some embodiments.

FIG. 1 is a block diagram illustrating an example of computer device 100 incorporated with the context sensitive interrupt teachings of the present disclosure, according to some embodiments. Examples of computer device 100, except for the context sensitive interrupt teachings of the present disclosure, may include, without limitation, a server, a workstation computer, a desktop computer, a laptop computer, a tablet computer (e.g., iPad®, GalaxyTab® and the like), an ultraportable computer, an ultramobile computer, a netbook computer and/or a subnotebook computer, a mobile telephone including, but not limited to a smart phone, (e.g., iPhone®, Android®-based phone, Blackberry®, Symbian®-based phone, Palm®-based phone, etc.), a feature phone, an "internet of things" computer device, a wearable computing device, a virtual or augmented reality display or supporting computers therefore, and the like.

Computer device 100 may include chipset 155, comprising processor 169, input/output (I/O) port(s) and peripheral device interfaces, such as output interface 140 and input interface 145, and network interface 130, hardware exception unit 168, and computer device memory 150, all interconnected via bus 120. Hardware exception unit 168 may be a component of processor 169 and may be incorporated with aspects of the context sensitive interrupt technology, described more fully below. Network interface 130 may be utilized to couple processor 169 to a network interface card (NIC) to form connections with network 150, with computer device datastore 170, or to form device-to-device connections with other computers.

Chipset 155 may include communication components and/or paths, e.g., buses 120, that couple processor 169 to peripheral devices, such as via, for example, output interface 140 and input interface 145, which may be connected via I/O ports. For example, chipset 155 may include a peripheral controller hub (PCH) (not shown). In another example, chipset 155 may include a sensors hub. Input interface 145 and output interface 140 may couple processor 169 to input and/or output devices that include, for example, user and machine interface device(s) including a display, a touchscreen display, printer, keypad, keyboard, etc., sensor(s) including inertial measurement unit(s), camera(s), global positioning system (GPS), etc., storage device(s) including hard disk drives, solid-state drives, removable storage media, etc. I/O ports for input interface 145 and output interface 140 may be configured to transmit and/or receive commands and/or data according to one or more protocols. For example, one or more of the I/O ports may comply and/or be compatible with a universal serial bus (USB) protocol, peripheral component interconnect (PCI) protocol (e.g., PCI express (PCIe)), or the like.

Processor 169 may include one or more execution core(s), which may be central processing units ("CPUs") and/or graphics processing units ("GPUs") one or more registers, and one or more cache memor(ies). Processor 169 may include a memory management unit (MMU) to manage memory accesses between processor 169 and computer device memory 150. In some embodiments, processor 169 may be configured as one or more socket(s); each socket may include one or more core(s), a plurality of registers and one or more cache memor(ies). Each core may be configured to execute one or more process(es) 165 and/or one or more thread(s) in one or more compartments. Selective one of these executions may leverage the context sensitive interrupt technology of the present disclosure. A plurality of registers may include a plurality of general purpose registers, a status register and an instruction pointer. Cache(s) may include one or more cache memories, which may be used to cache, for example, context-specific interrupt instantiation module 300.

Registers of processor 169 may include a model-specific register, such as model specific register 167. Model specific register 167 (or another register) may be used as a trusted task control and status register in the provision of context sensitive interrupts, according to an embodiment. The trusted task control and status register, in some embodiments, may be a software accessible model-specific register provided by a processor to enable trusted task control, as discussed in relation to context-specific interrupt instantiation module 300 described more fully below. A flag, bit or other status indicator in trusted task control and status register, such as in model specific register 167, may indicate whether trusted task features are active, and lock down the feature until the next system reset. Trusted task control and status register may be a 64-bit register that includes a readable and writeable trusted task feature enable bit, a readable trusted task feature active bit, and a readable and writeable lock bit. Trusted task control and status register may be used, for example, in the context of creating and securing compartments and asset thereof, such as IDT entries and context-sensitive LDTs, as discussed further herein.

Computer device memory 150 may generally comprise a random access memory ("RAM"), a read only memory ("ROM"), and a permanent mass storage device, such as a disk drive or SDRAM (synchronous dynamic random-access memory). Computer device memory 150 may store program code for software modules or routines, such as, for example, context-specific interrupt instantiation module 300 (illustrated and discussed further in relation to FIG. 3) and interrupt dispatch table 172. Computer device memory 150 may also store (OS and TEE) compartments 156, which may comprise or be associated with corresponding context-sensitive local descriptor table, such as local descriptor table A-N 175 (compartments, the IDT, and LDTs are further discussed in relation to FIGS. 2 and 3).

Computer device memory 150 may also store operating system 180. These software components may be loaded from a non-transient computer readable storage medium 195 into computer device memory 150 using a drive mechanism associated with a non-transient computer readable storage medium 195, such as a floppy disc, tape, DVD/CD-ROM drive, memory card, or other like storage medium. In some embodiments, software components may also or instead be loaded via a mechanism other than a drive mechanism and computer readable storage medium 195 (e.g., via network interface 130).

Computer device memory 150 is also illustrated as comprising kernel 185, kernel space 195, user space 190, user protected address space 160, and computer device datastore 170.

Computer device memory 150 may store one or more process 165 (i.e., executing software application(s)). Process 165 may be stored in user space 190. Process 165 may include one or more other process 165a . . . 165n. One or more process 165 may execute generally in parallel, i.e., as a plurality of processes and/or a plurality of threads.

Computer device memory 150 is further illustrated as storing operating system 180 and/or kernel 185. The operating system 180 and/or kernel 185 may be stored in kernel space 195. In some embodiments, operating system 180 may include kernel 185. Operating system 180 and/or kernel 185 may attempt to protect kernel space 195 and prevent access by one or more process 165a . . . 165n.

Kernel 185 may be configured to provide an interface between user processes and circuitry associated with computer device 100. In other words, kernel 185 may be configured to manage access to processor 169, chipset 155, I/O ports and peripheral devices by process 165. Kernel 185 may include one or more drivers configured to manage and/or communicate with elements of computer device 100 (i.e., processor 169, chipset 155, I/O ports and peripheral devices).

Computer device datastore 170 illustrated in the computer device of FIG. 1 may comprise multiple datastores, in and/or remote with respect to computer device 100. Datastore 170 may be distributed. The components of computer device datastore 170 may include data groups used by modules and/or routines. The data groups used by modules or routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Figure 2:
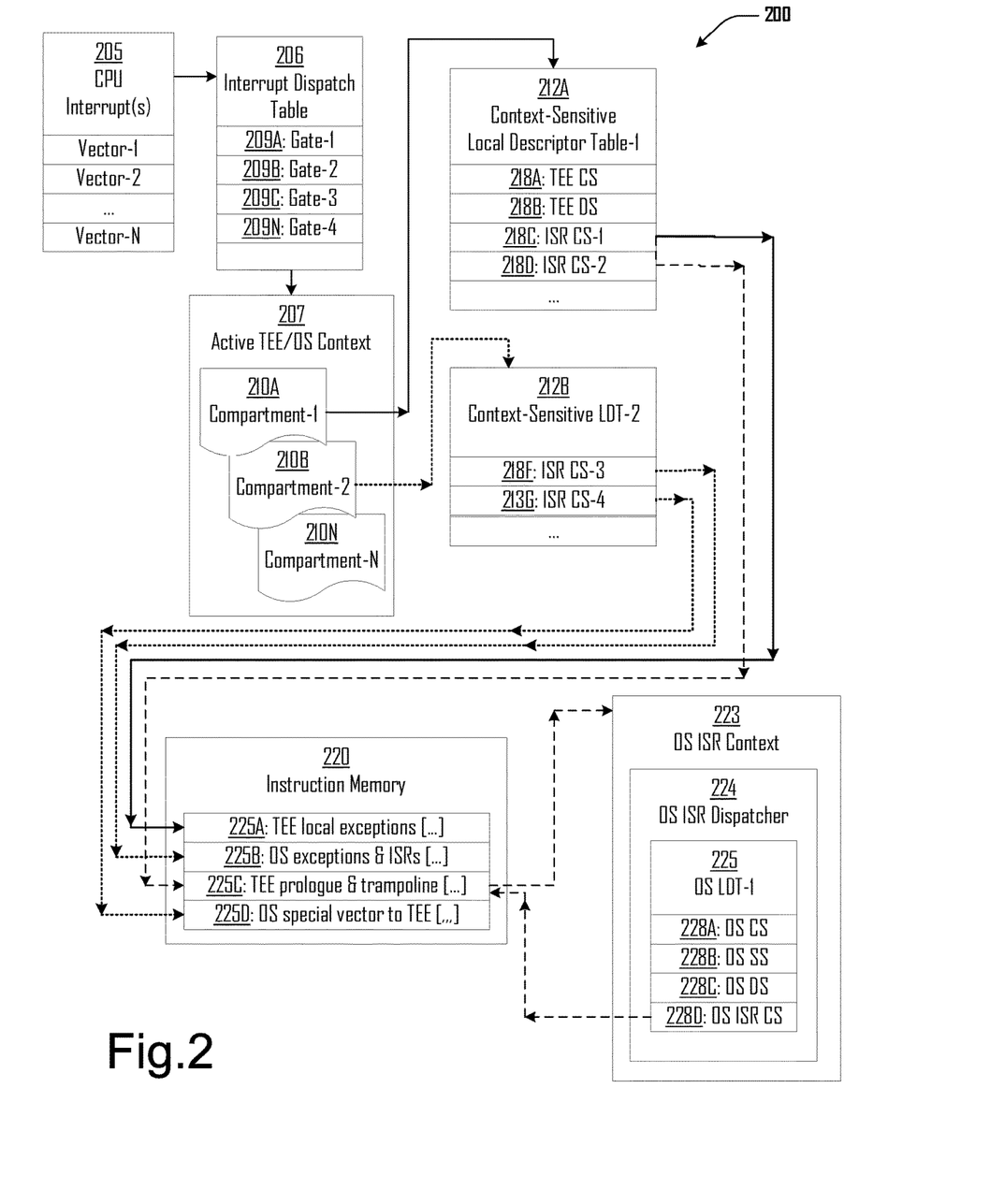
FIG. 2 is a block diagram illustrating an example of logical relationships among a set of records and logic processing areas in a computer device, produced in the course of practicing the present disclosure, consistent with embodiments.

FIG. 2 is a block diagram illustrating an example of logical relationships among a set of records and/or logic processing areas 200 in a computer device, such as computer device 100, produced in the course of practicing the present disclosure, consistent with embodiments.

Block 205 illustrates CPU interrupt signal(s) received by, for example, hardware exception unit 168. Processor 169 may process interrupt signals as vectors or other data structures, such as Vector-1 through Vector-N illustrated in FIG. 2. For example, I/O devices may have interrupt lines leading to the HW exception unit. Upon detection of a vector by a hardware exception unit, the hardware exception unit may trigger an interrupt request ("IRQ"). If accepted, an IRQ will cause the HW exception unit to stop current execution and walk an IDT, such as, for example IDT 206 in FIG. 2. Gates in IDT may trigger a hardware switch between compartments and may lead to a context-sensitive LDT for the then-current compartment. There may be compartments for one or more OS as well as for one or more TEE of computer device 100. The compartments may store and retrieve their state in such compartment prior to and returning from an interrupt. As illustrated in active TEE and OS contexts 207 and context-sensitive LDT-1 and -2, 212A and 212B, compartment-1 210A may be associated with context-sensitive LDT-1 212A while compartment-2 210B may be associated with context-sensitive LDT-2 212B.

In the example illustrated in FIG. 2, instead of delivering, for example, vector-1 directly based on a list of vectors, vector-1 may be associated with gate-1 in IDT 206, which may be associated with compartment-1 210A. Compartment-1 210A is associated with local descriptor table ("LDT")-1 212A while compartment-2 210B is associated with LDT-2 212B. Thus, the interrupt vectors are associated with context-specific LDTs, rather than with records in a general descriptor table ("GDT"), as may be typical in legacy approaches. This association may be secured by, for example, context-specific interrupt instantiation module 300.

As illustrated in the example in FIG. 2, context-sensitive LDT-1 212A may be programmed with memory segment descriptors 218A-218D, identifying individual ranges of ISR code and data, as well as other compartment memory. The LDT may be switched as part of a task switch and may be protected against unauthorized software modification by an extension implemented by context-specific interrupt instantiation module 300.

In this way, a hardware exception unit or a software interrupt may automatically invokes different ISRs depending on the context-sensitive LDT of the currently active IA task or compartment. This offers greater flexibility and differentiates this approach relative to legacy schemes which, for example, may require implementation of interrupts by a trusted runtime entity, such as, for example, a TZ Monitor.

In an example illustrated in FIG. 2, interrupt signal, vector-1 may be associated with compartment-1 210A, which is associated with LDT-1 212A, and triggers parsing of ISR code segment-1 218C. ISR code segment-1 218C in turn points to another ISR code segment in instruction memory 220 which may implement, for example, a general handler for TEE local exceptions 225A, such as general protection faults leading to a shutdown/failsafe mode of the TEE application, as in, for example:

recoverable: handle; iret

Else: cleanup; loop

In another example illustrated in FIG. 2 with respect to LDT-1 212A, vector-N may, via IDT 206, be associated with LDT-1 212A and ISR CS-2 218D, which points to an ISR in instruction memory 220 which is a TEE prologue and trampoline 225C to OS ISR context 223, which may lead to, such as via nested (iret to task) EIP set to ISR patcher loop, OS ISR dispatcher 224 and OS LDT-1 225 and OS ISR CS 228D, where the actual handler of the interrupt vector is implemented. An implementation such as this may load some or all of the vector information of vector-N into a shared data memory segment, perform optional local cleanup and then invoke the OS ISR context using an x86 far call. The OS ISR is activated by defining a secondary OS ISR context, which may be via a TSS, with identical access and permissions as the actual OS context (OS TSS), but with a manipulated startup state (TSS) leading to direct execution of an "OS ISR dispatch" function. This function inspects shared memory to identify the interrupt vector reported by the TEE trampoline and then invokes the corresponding local OS ISR, such as OS ISR CS 228D. Since the OS ISR TSS was invoked with a far call, it is an IA nested task and the OS ISR 'iret' directly returns to the calling TEE, TEE prologue and trampoline 225C.

In another example illustrated in FIG. 2, a vector, such as vector-2 may be associated with compartment-2 210B, which is associated with context-sensitive LDT-2 212B, and ISR CS-3 218F. As illustrated, for example, ISR CS-3 218F may be associated with OS interrupts, such as OS exceptions and ISRs 225B.

For a memory efficient implementation, many of the ISRs for the various compartments in a system may be implemented in a similar fashion and share their code not only across compartments but also interrupt vectors. For example, most local exception handlers and TEE to OS trampolines are expected to have identical implementations. In this case, the ISR CS in the respective LDTs may point to identical code memory locations, with individual context and vector information being handled only in form of local stack/data. The integrity of such shared code may be protected independently of the TEEs, for example using a memory writelock.

Note that such shared code does not imply a common trusted runtime as there is no or not necessarily any shared state; even if the ISR in one TEE context is compromised, other TEEs maintain their security while using the same/shared ISR code.

Figure 3:
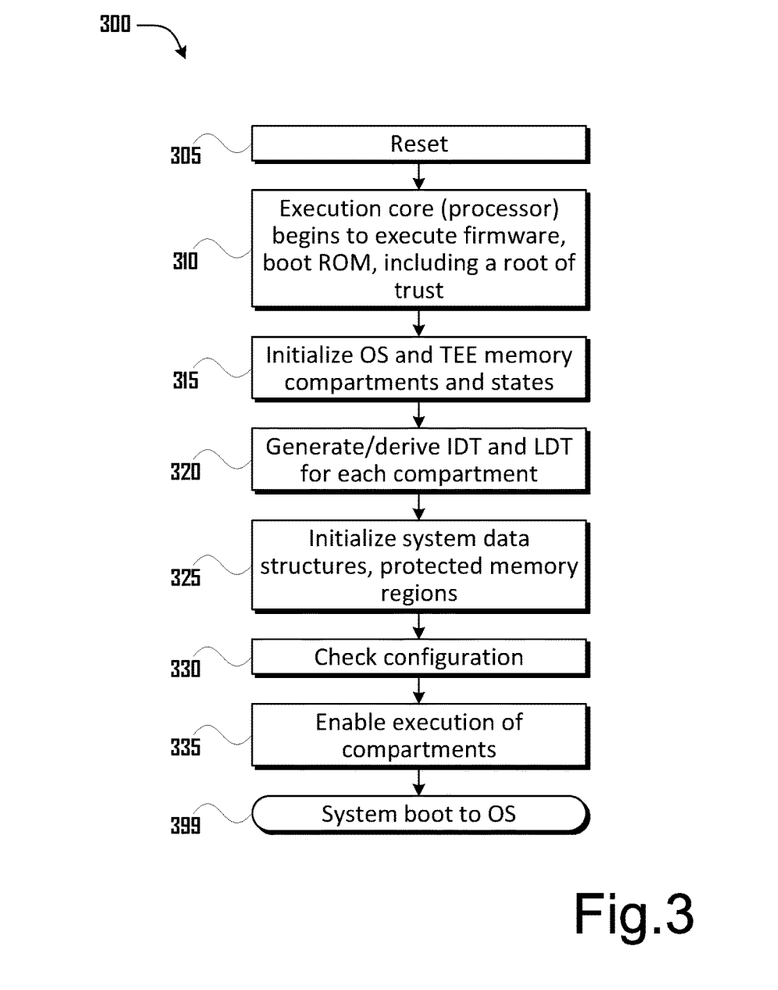
FIG. 3 is a flow diagram illustrating an example of a method performed by a context-specific interrupt instantiation module, according to some embodiments.

FIG. 3 is a flow diagram illustrating an example of a method performed by a context-specific interrupt instantiation module 300, according to some embodiments. Context-specific interrupt instantiation module 300 may be performed by, for example, computer device 100.

Context-specific interrupt instantiation module 300 may initialize a trusted task primitive after power-on, according to an embodiment. After reset 305, at block 310 the execution core begins executing firmware Root-of-Trust instructions stored in a boot ROM. At block 315, trusted task data structures and operating system memory and state are initialized.

At block 320, per-trusted task assets are created, generated or derived, including IDT entries, or gates, and an LDT for each compartment. This may be performed according to instructions provided by applications for a TEE or a TEE loader. Per-trusted task assets may include, for example, IDT entries pointing to an LDT of the task compartment and a context-sensitive LDT, one for each task compartment.

For example, in an IDT of computer device 100, context-specific interrupt instantiation module 300 may create a set of IDT gates, one set of IDT gates for each compartment of computer device 100. The IDT gates may be programmed to perform a context switch, for example, to invoke a compartment, to walk a context-sensitive LDT of the then-active compartment, and, via memory segment descriptors in the context-sensitive LDT, to invoke an ISR. This may be according to the examples discussed in relation to FIG. 2.

At block 320, the context-sensitive LDTs may be created with memory segment descriptors, wherein the memory segment descriptors identify ISR code and data of corresponding interrupts. The ISR code and data may be invoked via at least one of a general descriptor table ("GDT") or LDT with a call to an ISR of an operating system. Such call may be, for example, a far call. The handlers may share immutable code across compartments, such as by memory segment descriptors pointing to a common memory location. Integrity of the immutable code may be protected by a write access protection, such as by a trusted task enabled bit in a trusted task control and status register (discussed below in relation to block 335). The handlers may be customized for each compartment and/or application within each compartment.

At 325, system data structures and protected memory regions are initialized. At 330, the configuration is checked to ensure that it is valid. If it is invalid, the system may halt. If the configuration is valid, at 335 a trusted task feature is enabled by setting a trusted task enabled bit in a trusted task control and status register, for example, in model-specific register 167, described above. In conjunction with enabling the trusted task feature at 335, the trusted task feature is locked by setting a lock bit in the trusted task control and status register. At 399, the trusted task feature having been configured, the system boots to the operating system. The execution flow of FIG. 3 thus comprises one embodiment of initializing and enabling a trusted task mode primitive by a processor.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are examples:

Example 1

An apparatus for computing, comprising: a computer processor, a memory, and a hardware exception unit; and a context-sensitive interrupt instantiation module to instantiate an interrupt of a process executed by the computer processor in a compartment, wherein to instantiate the interrupt, the context-sensitive interrupt instantiation module is to create an interrupt gate entry in an interrupt dispatch table ("IDT"), wherein the interrupt gate entry is to be resolved at runtime according to a then-active compartment, independent of other compartments, to trigger the interrupt and interrupt the process upon detection of an interrupt signal by the hardware exception unit.

Example 2

The apparatus according to Example 1, wherein the then-active compartment is one of a compartment of an operating system ("OS") or of a trusted execution environment ("TEE"), wherein the compartment uses a memory region of the memory protected by a root of trust, and wherein the interrupt is to be invoked directly, without a mutually trusted dispatcher.

Example 3

The apparatus according to Example 2, wherein the compartment of the OS or of the TEE is to store and retrieve its state in such compartment prior to and upon returning from the interrupt.

Example 4

The apparatus according to one or more of Example 1 to Example 3, wherein the interrupt signal comprises a prefix to perform at least one of a clearing a shared resource, a timer, or a memory-mapped input/output register prior to an implementation of the interrupt, wherein the prefix is shared as immutable code across more than one compartment or is customized for each compartment and/or application within each compartment.

Example 5

The apparatus according to Example 1, wherein the context-sensitive interrupt instantiation module is to create the interrupt gate entry in the IDT to invoke a context-sensitive local descriptor table record ("context-sensitive LDT record").

Example 6

The apparatus according to Example 5, wherein the context-sensitive interrupt instantiation module is to program the context-sensitive LDT record with a memory segment descriptor, wherein the memory segment descriptor identifies an interrupt service routine ("ISR") code and data of the interrupt.

Example 7

The apparatus according to Example 6, wherein the context-sensitive interrupt instantiation module is to instantiate a plurality of interrupts, wherein at least two of the plurality of interrupts comprise memory segment descriptors, wherein the memory segment descriptors point to a common memory location, wherein the common memory location comprises the ISR code and data of the interrupt.

Example 8

The apparatus according to Example 7, wherein an integrity of the common memory location is protected by a write access protection.

Example 9

The apparatus according to Example 5, wherein the context-sensitive interrupt instantiation module is to instantiate the interrupt according to at least one of an application for a trusted execution environment ("TEE") or a TEE loader during initialization of the computer processor.

Example 10

The apparatus according to Example 5, wherein the interrupt gate entry is to invoke the context-sensitive LDT record with a gate to the context-sensitive LDT record.

Example 11

The apparatus according to Example 1, wherein the context-sensitive interrupt instantiation module is to create a context-sensitive local descriptor table ("LDT") record for each compartment, program the interrupt gate entry to point to the context-sensitive LDT record for a then-active compartment, and wherein the context-sensitive interrupt instantiation module is to program the LDT record to perform a call to an interrupt service routine ("ISR") of an operating system executed by the computer processor.

Example 12

The apparatus according to Example 11, wherein the context-sensitive interrupt instantiation module is further to program the interrupt gate to load the interrupt signal into a shared memory segment, and activate the context-sensitive LDT record with the call to the ISR of the operating system using a far call.

Example 13

The apparatus according to Example 12, wherein the far call comprises a task state segment ("TSS") comprising an access and permissions of the ISR of the operating system and with a startup state to cause the computer processor to inspect the interrupt signal in the shared memory in conjunction with the call to the ISR of the operating system.

Example 14

The apparatus according to Example 13, wherein the TSS is a nested task and wherein an interrupt return of the ISR of the operating system is to cause a return to a compartment memory of an application for a trusted execution environment ("TEE").

Example 15

The apparatus according to Example 1, wherein the hardware exception unit is to detect the interrupt signal, trigger the interrupt, and interrupt the process.

Example 16

The apparatus according to Example 15, wherein the hardware exception unit is to trigger the interrupt via a kernel mode device driver, wherein the kernel mode device driver is to detect the interrupt signal and add it to a kernel process.

Example 17

A computer implemented method, comprising: instantiating an interrupt to interrupt a process of a computer processor by creating a plurality of interrupt dispatch tables ("IDTs"), one for each compartment of a computer processor and creating an interrupt gate entry in an IDT of the plurality of the IDTs, wherein the interrupt gate entry is to be resolved at runtime according to a then-active compartment, independent of other compartments, to trigger the interrupt and interrupt the process upon detection of an interrupt signal.

Example 18

The method according to Example 17, wherein the then-active compartment is one of a compartment of an operating system ("OS") or of a trusted execution environment ("TEE"), and further comprising protecting a memory region used by the compartment with a root of trust, and wherein the interrupt is to be invoked directly, without a mutually trusted dispatcher.

Example 19

The method according to Example 18, wherein the compartment of the OS or of the TEE is to store and retrieve its state in such compartment prior to and upon returning from the interrupt.

Example 20

The method according to one or more of Example 17 to Example 19, wherein the interrupt signal comprises a prefix, wherein the prefix is to cause the computer processor to perform at runtime at least one of a clearing of a shared resource, a timer, or a memory-mapped input/output register prior to an implementation of the interrupt, wherein the prefix is shared as immutable code across more than one compartment or is customized for each compartment and/or application within each compartment.

Example 21

The method according to Example 17, wherein creating the interrupt gate entry in the IDT comprising creating the interrupt gate entry in the IDT to invoke a context-sensitive local descriptor table record ("context-sensitive LDT record").

Example 22

The method according to Example 21, further comprising programming the context-sensitive LDT record with a memory segment descriptor, wherein the memory segment descriptor identifies an interrupt service routine ("ISR") code and data of the interrupt.

Example 23

The method according to Example 22, further comprising instantiating a plurality of interrupts, wherein at least two of the plurality of interrupts comprise memory segment descriptors, wherein the memory segment descriptors point to a common memory location, wherein the common memory location comprises the ISR code and data of the interrupt.

Example 24

The method according to Example 23, wherein an integrity of the common memory location is protected by a write access protection.

Example 25

The method according to Example 21, further comprising instantiating the interrupt according to at least one of an application for a trusted execution environment ("TEE") or a TEE loader during initialization of the computer processor.

Example 26

The method according to Example 21, wherein the interrupt gate entry is to invoke the context-sensitive LDT record with a gate to the context-sensitive LDT record.

Example 27

The method according to Example 17, further comprising creating a context-sensitive LDT for each compartment and programming the interrupt gate to point to the context-sensitive LDT record for a then-active compartment, and programming the LDT record to perform a call to an interrupt service routine ("ISR") of an operating system.

Example 28

The method according to Example 27, further comprising programming the interrupt gate to load the interrupt signal into a shared memory segment and to activate the context-sensitive LDT record with the call to the ISR of the operating system using a far call.

Example 29

The method according to Example 28, wherein the far call comprises a task state segment ("TSS") comprising an access and permissions of the ISR of the operating system and with a startup state to cause the computer processor to inspect the interrupt signal in the shared memory in conjunction with the call to the ISR of the operating system.

Example 30

The method according to Example 29, wherein the TSS is a nested task and wherein an interrupt return of the ISR of the operating system is to cause a return to a compartment memory of an application for a trusted execution environment ("TEE").

Example 31

The method according to Example 17, further comprising detecting the interrupt signal with a hardware exception unit, triggering the interrupt, and interrupting the process.

Example 32

The method according to Example 32, further comprising triggering the interrupt via a kernel mode device driver, wherein the kernel mode device driver is to detect the interrupt signal and add it to a kernel process.

Example 33

An apparatus to instantiate an interrupt of a process executed by a computer processor in a compartment, comprising: means to create a plurality of interrupt dispatch tables ("IDTs"), one for each compartment of the computer processor; and means to create an interrupt gate entry in an IDT of the plurality of the IDTs, wherein the interrupt gate entry is to be resolved at runtime by the computer processor according to a then-active compartment, independent of other compartments, to trigger the interrupt and interrupt the process upon detection of an interrupt signal by a hardware exception unit.

Example 34

The apparatus according to Example 33, wherein the then-active compartment is one of a compartment of an operating system ("OS") or of a trusted execution environment ("TEE"), and further comprising means to protect a memory region of the compartment with a root of trust, and wherein the interrupt is to be invoked directly, without a mutually trusted dispatcher.

Example 35

The apparatus according to Example 34, further comprising means for the compartment of the OS or of the TEE to store and retrieve its state in such compartment prior to and upon returning from the interrupt.

Example 36

The apparatus according to one or more of Example 33 to Example 35, wherein the interrupt signal comprises a prefix and further comprising means for the computer processor to use the prefix at runtime to perform at least one of a clearing of a shared resource, a timer, or a memory-mapped input/output register prior to an implementation of the interrupt, and further comprising means to share the prefix as immutable code across more than one compartment or is customized for each compartment and/or application within each compartment.

Example 37

The apparatus according to Example 33, further comprising means to create the interrupt gate entry in the IDT to invoke a context-sensitive local descriptor table record ("context-sensitive LDT record").

Example 38

The apparatus according to Example 37, further comprising means to program the context-sensitive LDT record with a memory segment descriptor, and means for the memory segment descriptor to identify an interrupt service routine ("ISR") code and data of the interrupt.

Example 39

The apparatus according to Example 38, further comprising means to instantiate a plurality of interrupts in more than one of the plurality of IDTs, wherein at least two of the plurality of interrupts comprise memory segment descriptors, wherein the memory segment descriptors point to a common memory location, wherein the common memory location comprises the ISR code and data of the interrupt.

Example 40

The apparatus according to Example 39, further comprising means to protect an integrity of the common memory location by a write access protection.

Example 41

The apparatus according to Example 37, further comprising means to instantiate the interrupt according to at least one of an application for a trusted execution environment ("TEE") or a TEE loader during initialization of the computer processor.

Example 42

The apparatus according to Example 37, further comprising means for the interrupt gate entry to invoke the context-sensitive LDT record at runtime with a gate to the context-sensitive LDT record.

Example 43

The apparatus according to Example 33, further comprising means to create a context-sensitive local descriptor table ("LDT") record for each compartment, program the interrupt gate entry to point to the context-sensitive LDT record of a then-active compartment, and further comprising means to program the LDT record to perform a call to an interrupt service routine ("ISR") of an operating system executed by the computer processor.

Example 44

The apparatus according to Example 43, further comprising means to program the interrupt gate to load the interrupt signal into a shared memory segment and means to activate the context-sensitive LDT record with the call to the ISR of the operating system using a far call at runtime.

Example 45

The apparatus according to Example 44, wherein the far call comprises a task state segment ("TSS") comprising an access and permissions of the ISR of the operating system and with a startup state to cause the computer processor to inspect the interrupt signal in the shared memory in conjunction with the call to the ISR of the operating system.

Example 46

The apparatus according to Example 45, wherein the TSS is a nested task and further comprising means for an interrupt return of the ISR of the operating system to cause a return to a compartment memory of an application for a trusted execution environment ("TEE").

Example 47

The apparatus according to Example 33, further comprising means for the hardware exception unit to detect the interrupt signal, trigger the interrupt, and interrupt the process.

Example 48

The apparatus according to Example 47, further comprising means for the hardware exception unit to trigger the interrupt via a kernel mode device driver, and further comprising means for the kernel mode device driver to detect the interrupt signal and add it to a kernel process.

Example 49

One or more computer-readable media comprising instructions that cause a computer device, in response to execution of the instructions by a processor of the computer device, to: create a plurality of interrupt dispatch tables ("IDTs"), one for each compartment of the computer processor; and create an interrupt gate entry in an IDT of the plurality of the IDTs, wherein the interrupt gate entry is to be resolved at runtime by the computer processor according to a then-active compartment, independent of other compartments, to trigger the interrupt and interrupt the process upon detection of an interrupt signal by a hardware exception unit.

Example 50

The computer-readable media according to Example 49, wherein the then-active compartment is one of a compartment of an operating system ("OS") or of a trusted execution environment ("TEE"), and wherein the instructions are further to cause the computer processor to protect a memory region of the compartment with a root of trust, and wherein the interrupt is to be invoked directly, without a mutually trusted dispatcher.

Example 51

The computer-readable media according to Example 50, wherein the instructions are further to cause the computer processor to store and retrieve the state of the OS or of the TEE in a corresponding compartment prior to and upon returning from the interrupt.

Example 52

The computer-readable media according to one or more of Example 49 to Example 51, wherein the interrupt signal comprises a prefix and wherein the instructions are further to cause the computer processor to use the prefix at runtime to perform at least one of a clearing of a shared resource, a timer, or a memory-mapped input/output register prior to an implementation of the interrupt, and further comprising wherein the instructions are to cause the computer processor to share the prefix as immutable code across more than one compartment or as customized for each compartment and/or application within each compartment.

Example 53

The computer-readable media according to Example 49, wherein the instructions are further to cause the computer processor to create the interrupt gate entry in the IDT to invoke a context-sensitive local descriptor table record ("context-sensitive LDT record").

Example 54

The computer-readable media according to Example 53, wherein the instructions are further to cause the computer processor to program the context-sensitive LDT record with a memory segment descriptor, wherein the memory segment descriptor identifies an interrupt service routine ("ISR") code and data of the interrupt.

Example 55

The computer-readable media according to Example 54, wherein the instructions are further to cause the computer processor to instantiate a plurality of interrupts in more than one of the plurality of IDTs, wherein at least two of the plurality of interrupts comprise memory segment descriptors, wherein the memory segment descriptors point to a common memory location, wherein the common memory location comprises the ISR code and data of the interrupt.

Example 56

The computer-readable media according to Example 55, wherein the instructions are further to cause the computer processor to protect an integrity of the common memory location by a write access protection.

Example 57

The computer-readable media according to Example 53, wherein the instructions are further to cause the computer processor to instantiate the interrupt according to at least one of an application for a trusted execution environment ("TEE") or a TEE loader during initialization of the computer processor.

Example 58

The computer-readable media according to Example 53, further comprising means for the interrupt gate entry to invoke the context-sensitive LDT record at runtime with a gate to the context-sensitive LDT record.

Example 59

The computer-readable media according to Example 49, wherein the instructions are further to cause the computer processor to create a context-sensitive local descriptor table ("LDT") record for each compartment, to program the interrupt gate entry to point to the context-sensitive LDT record for a then-active compartment, and to program the LDT record to perform a call to an interrupt service routine ("ISR") of an operating system executed by the computer processor.

Example 60

The computer-readable media according to Example 59, wherein the instructions are further to cause the computer processor to program the interrupt gate to load the interrupt signal into a shared memory segment and activate the context-sensitive LDT record with the call to the ISR of the operating system using a far call at runtime.

Example 61

The computer-readable media according to Example 60, wherein the far call comprises a task state segment ("TSS") comprising an access and permissions of the ISR of the operating system and with a startup state to cause the computer processor to inspect the interrupt signal in the shared memory in conjunction with the call to the ISR of the operating system.

Example 62

The computer-readable media according to Example 61, wherein the TSS is a nested task and wherein the instructions are further to cause the computer processor to program an interrupt return of the ISR of the operating system to return to a compartment memory of an application for a trusted execution environment ("TEE").

Example 63

The computer-readable media according to Example 49, wherein the instructions are further to cause the computer processor to detect the interrupt signal, trigger the interrupt, and interrupt the process.

Example 64

The computer-readable media according to Example 63, wherein the instructions are further to cause the computer processor to trigger the interrupt via a kernel mode device driver and add the interrupt to a kernel process.

Example 65

A system comprising a computer processor, a memory, a hardware exception unit, and an input interface, wherein the system is to: instantiate an interrupt of a process executed by the computer processor in a compartment, wherein to instantiate the interrupt, the system is to create an interrupt gate entry in an interrupt dispatch table ("IDT"), wherein the interrupt gate entry is to be resolved at runtime by the system according to a then-active compartment, independent of other compartments, to trigger the interrupt and interrupt the process upon detection of an interrupt signal by the hardware exception unit.

Example 66

The system according to Example 65, wherein the then-active compartment is one of a compartment of an operating system ("OS") or of a trusted execution environment ("TEE"), wherein the compartment uses a memory region of the memory protected by a root of trust, and wherein the interrupt is to be invoked directly, without a mutually trusted dispatcher.

Example 67

The system according to Example 66, wherein the compartment of the OS or of the TEE is to store and retrieve its state in such compartment prior to and upon returning from the interrupt.

Example 68

The system according to one or more of Example 65 to Example 67, wherein the interrupt signal comprises a prefix to perform at least one of a clearing a shared resource, a timer, or a memory-mapped input/output register prior to an implementation of the interrupt, wherein the prefix is shared as immutable code across more than one compartment or is customized for each compartment and/or application within each compartment.

Example 69

The system according to Example 65, wherein the system is further to create the interrupt gate entry in the IDT to invoke a context-sensitive local descriptor table record ("context-sensitive LDT record").

Example 70

The system according to Example 69, wherein the system is to program the context-sensitive LDT record with a memory segment descriptor, wherein the memory segment descriptor identifies an interrupt service routine ("ISR") code and data of the interrupt.

Example 71

The system according to Example 70, wherein the system is to instantiate a plurality of interrupts, wherein at least two of the plurality of interrupts comprise memory segment descriptors, wherein the memory segment descriptors point to a common memory location, wherein the common memory location comprises the ISR code and data of the interrupt.

Example 72

The system according to Example 71, wherein an integrity of the common memory location is protected by a write access protection.

Example 73

The system according to Example 69, wherein the system is to instantiate the interrupt according to at least one of an application for a trusted execution environment ("TEE") or a TEE loader during initialization of the computer processor.

Example 74

The system according to Example 69, wherein the interrupt gate entry is to invoke the context-sensitive LDT record with a gate to the context-sensitive LDT record.

Example 75

The system according to Example 65, wherein the system is to create a context-sensitive local descriptor table ("LDT") record for each compartment, is to program the interrupt gate entry to point to the context-sensitive LDT record for a then-active compartment, and wherein the system is to program the LDT record to perform a call to an interrupt service routine ("ISR") of an operating system executed by the computer processor.

Example 76

The system according to Example 75, wherein the system is further to program the interrupt gate to load the interrupt signal into a shared memory segment, and activate the context-sensitive LDT record with the call to the ISR of the operating system using a far call.

Example 77

The system according to Example 76, wherein the far call comprises a task state segment ("TSS") comprising an access and permissions of the ISR of the operating system and with a startup state to cause the computer processor to inspect the interrupt signal in the shared memory in conjunction with the call to the ISR of the operating system.

Example 78

The system according to Example 77, wherein the TSS is a nested task and wherein an interrupt return of the ISR of the operating system is to cause a return to a compartment memory of an application for a trusted execution environment ("TEE").

Example 79

The system according to Example 65, wherein the hardware exception unit is to detect the interrupt signal via the input interface, trigger the interrupt, and interrupt the process.

Example 80

The system according to Example 79, wherein the hardware exception unit is to trigger the interrupt via a kernel mode device driver, wherein the kernel mode device driver is to detect the interrupt signal and add it to a kernel process.

The invention claimed is:

1. An apparatus for computing, comprising:
a computer processor including a hardware exception unit; and
a memory coupled with the computer processor to host an interrupt dispatch table ("IDT"), a plurality of execution compartments having respective one or more processes, and a context-sensitive interrupt instantiation module, to be accessed or executed by the computer processor;
wherein the context-sensitive interrupt instantiation module is to instantiate an interrupt of a process in one of the execution compartments;
wherein to instantiate the interrupt, the context-sensitive interrupt instantiation module is to create an interrupt gate entry in the IDT, wherein the interrupt gate entry is resolved at runtime when the execution compartment of the process is active, independent of other execution compartments, to trigger the interrupt, and interrupt the process using the hardware exception unit.

2. The apparatus according to claim 1, wherein the context-sensitive interrupt instantiation module is to create the interrupt gate entry in the IDT to invoke a context-sensitive local descriptor table record ("context-sensitive LDT record") within a local descriptor table ("LDT") of the execution compartment of the process; wherein the context-sensitive interrupt instantiation module is to program the context-sensitive LDT record with a memory segment descriptor, wherein the memory segment descriptor identifies an interrupt service routine ("ISR") code and data of the interrupt.

3. The apparatus according to claim 2, wherein the interrupt is a first interrupt, and wherein the context-sensitive interrupt instantiation module is to instantiate a second interrupts, wherein the first and second interrupts comprise first and second memory segment descriptors, wherein the first and second memory segment descriptors point to a common memory location, wherein the common memory location comprises the ISR code and data of the first and second interrupts, and wherein an integrity of the common memory location is protected by a write access protection.

4. The apparatus according to claim 1, wherein the execution compartment of the process is one of an execution environment of an operating system ("OS") or of a trusted execution environment ("TEE"), wherein the execution compartment uses a memory region of the memory protected by a root of trust, wherein the interrupt is to be invoked directly, without a mutually trusted dispatcher, and wherein the execution compartment of the execution environment of the OS or of the TEE is to store and retrieve its compartment state prior to and upon returning from the interrupt.

5. The apparatus according to claim 1, wherein the interrupt comprises a prefix to perform at least one of a clearing a shared resource, a timer, or a memory-mapped input/output register prior to an implementation of the interrupt, wherein the prefix is shared as immutable code across more than one execution compartment or is customized for each execution compartment, or each process within each execution compartment.

6. The apparatus according to claim 1, wherein the context-sensitive interrupt instantiation module is to instantiate the interrupt during initialization of the computer processor.

7. The apparatus according to claim 1, wherein the context-sensitive interrupt instantiation module is to create a context-sensitive local descriptor table ("LDT") for each execution compartment, program the interrupt gate entry to point to the context-sensitive LDT of the execution compartment of the process, and wherein the context-sensitive interrupt instantiation module is to program a record of the LDT of the execution compartment of the process to perform a far call to an interrupt service routine ("ISR") of an operating system or a TEE executed by the computer processor, wherein the far call comprises a task state segment ("TSS") comprising an access and permissions of the ISR of the operating system or TEE and with a startup state to cause the computer processor to inspect the interrupt.

8. A computer implemented method, comprising:
instantiating an interrupt to interrupt a process within a first of a plurality of execution compartments hosted by a computer processor, by first creating a plurality of interrupt dispatch tables ("IDTs"), one for each of the plurality of execution compartments, and then creating an interrupt gate entry in an IDT of the plurality of the IDTs corresponding to the execution compartment of the process, wherein the interrupt gate entry is to be resolved at runtime when the execution compartment of the process is active, independent of other execution compartments, to trigger the interrupt and interrupt the process.

9. The method according to claim 8, wherein creating the interrupt gate entry in the IDT corresponding to the execution compartment of the process comprising creating the interrupt gate entry in the IDT corresponding to the execution compartment of the process to invoke a context-sensitive local descriptor table record ("context-sensitive LDT record") in a local descriptor table ("LDT") of the execution compartment of the process, and programming the context-sensitive LDT record in the LDT with a memory segment descriptor, wherein the memory segment descriptor identifies an interrupt service routine ("ISR") code and data of the interrupt.

10. The method according to claim 9, wherein the interrupt is a first interrupt, and the method further comprises instantiating a second interrupts, wherein each of the first and second interrupts comprise memory segment descriptors, wherein the memory segment descriptors point to a common memory location, wherein the common memory location comprises the ISR code and data of the first and second interrupts, and wherein an integrity of the common memory location is protected by a write access protection.

11. The method according to claim 8, wherein the execution compartment of the process is one of an execution environment of an operating system ("OS") or of a trusted execution environment ("TEE"), and the method further comprises protecting a memory region used by the execution compartment with a root of trust; wherein the interrupt is to be invoked directly, without a mutually trusted dispatcher, and wherein the execution compartment of the execution environment of the OS or of the TEE is to store and retrieve its compartment state prior to and upon returning from the interrupt.

12. The method according to claim 8, further comprising creating a context-sensitive LDT for each execution compartment and programming the interrupt gate to point to the context-sensitive LDT of the execution compartment of the process, and programming a record of the LDT to perform a far call to an interrupt service routine ("ISR"), wherein the far call comprises a task state segment ("TSS") including an access and permissions of the ISR and with a startup state to cause the computer processor to inspect the interrupt in conjunction with the far call.

13. A system comprising;
a computer processor including a hardware exception unit, wherein the system is to:
instantiate an interrupt to interrupt a process being executed in an execution compartment hosted by the computer processor, wherein to instantiate the interrupt, the system is to create an interrupt gate entry in an interrupt dispatch table ("IDT") associated with the execution compartment of the process, wherein the interrupt gate entry is to be resolved at runtime by the system when the execution compartment is active, independent of other execution compartments, to trigger the interrupt and interrupt the process, using the hardware exception unit.

14. The system according to claim 13, wherein the system is further to create the interrupt gate entry in the IDT associated with the execution compartment of the process to invoke a context-sensitive local descriptor table record ("context-sensitive LDT record") in a local descriptor table ("LDT") associated with the execution compartment of the process, wherein the system is to program the context-sensitive LDT record with a memory segment descriptor, wherein the memory segment descriptor identifies an interrupt service routine ("ISR") code and data of the interrupt.

15. The system according to claim 13, wherein the system further comprises memory coupled with the computer processor, and wherein the execution compartment of the process is one of an execution environment of an operating system ("OS") or of a trusted execution environment ("TEE"), wherein the execution compartment uses a memory region of the memory protected by a root of trust, and wherein the interrupt is to be invoked directly, without a mutually trusted dispatcher, wherein the execution compartment of the execution environment of the OS or of the TEE is to store and retrieve its compartment state prior to and upon returning from the interrupt.

16. The system according to claim 13, wherein the interrupt comprises a prefix to perform at least one of a clearing a shared resource, a timer, or a memory-mapped input/output register prior to an implementation of the interrupt, wherein the prefix is shared as immutable code across more than one execution compartment or is customized for each process within each execution compartment.

17. The system according to claim 13, wherein the interrupt is a first interrupt, and wherein the system is to instantiate a second interrupts, wherein the first and second interrupts comprise memory segment descriptors, wherein the memory segment descriptors point to a common memory location, wherein the common memory location comprises ISR code and data of the first and second interrupts.

18. The system according to claim 13, wherein the system is to instantiate the interrupt during initialization of the computer processor.

19. The system according to claim 13, wherein the system is to create a context-sensitive local descriptor table ("LDT") for each execution compartment, and program the interrupt gate entry to point to the context-sensitive LDT for the execution compartment of the process, and wherein the system is to program a record of the context-sensitive LDT to perform a far call to an interrupt service routine ("ISR"), wherein the far call comprises a task state segment ("TSS") including an access and permissions of the ISR with a startup state to cause the computer processor to inspect the interrupt in a shared memory in conjunction with the far call.

20. One or more non-transitory computer-readable media comprising instructions that cause a computer device, in response to execution of the instructions by a computer processor of the computer device, to:
create a plurality of interrupt dispatch tables ("IDTs"), one for each execution compartment hosted by the computer processor, each execution compartment having one or more processes executed by the computer processor; and
create an interrupt gate entry in an IDT of the plurality of the IDTs corresponding to an execution compartment with a process to be interrupted, wherein the interrupt gate entry is to be resolved at runtime by the computer processor when the execution compartment of the process is active, independent of other execution compartments, to trigger the interrupt and interrupt the process using a hardware exception unit of the computer processor.

21. The computer-readable media according to claim 20, wherein the instructions are further to cause the computer processor to create the interrupt gate entry in the IDT to invoke a context-sensitive local descriptor table record ("context-sensitive LDT record") of a local description table ("LDT") associated with the execution compartment of the process to be interrupted, wherein the instructions are further to cause the computer processor to program the context-sensitive LDT record with a memory segment descriptor, wherein the memory segment descriptor identifies an interrupt service routine ("ISR") code and data of the interrupt.

22. The computer-readable media according to claim 21, wherein the interrupt is a first interrupt, and wherein the instructions are further to cause the computer processor to instantiate a second interrupts, wherein the first and second interrupts comprise memory segment descriptors, wherein the memory segment descriptors point to a common memory location, wherein the common memory location comprises the ISR code and data of the first and second interrupt, and wherein an integrity of the common memory location is protected by a write access protection.

23. The computer-readable media according to claim 21, wherein the execution compartment of the process is one of an execution environment of an operating system ("OS") or of a trusted execution environment ("TEE"), and wherein the interrupt is to be invoked directly, without a mutually trusted dispatcher.

24. The computer-readable media according to claim 21, wherein the interrupt comprises a prefix and wherein the instructions are further to cause the computer processor to use the prefix at runtime to perform at least one of a clearing of a shared resource, a timer, or a memory-mapped input/output register prior to an implementation of the interrupt, and wherein the instructions are to further cause the computer processor to share the prefix as immutable code across more than one execution compartment or as customized for each execution compartment, or each process within each execution compartment.

25. The computer-readable media according to claim 21, wherein the instructions are further to cause the computer processor to create a context-sensitive local descriptor table ("LDT") for each execution compartment, to program the interrupt gate entry to point to the context-sensitive LDT of the execution compartment of the process, and to program a record of the LDT to perform a far call to an interrupt service routine ("ISR") of the execution environment of the operating system or the TEE, wherein the far call comprises a task state segment ("TSS").

* * * * *

UNITED STATES PATENT AND TRADEMARK OFFICE
CERTIFICATE OF CORRECTION

PATENT NO. : 10,496,573 B2
APPLICATION NO. : 15/476001
DATED : December 3, 2019
INVENTOR(S) : Steffen Schultz et al.

It is certified that error appears in the above-identified patent and that said Letters Patent is hereby corrected as shown below:

In the Claims

Column 20
Line 28, Claim 3 "interrupts…" should read – "interrupt…"

Column 21
Line 32, Claim 10 "…a second interrupts," should read – "…a second interrupt,"

Column 22
Line 38, Claim 17 "…a second interrupts," should read – "…a second interrupt,"

Column 23
Line 22, Claim 22 "…a second interrupts," should read – "…a second interrupt,"

Signed and Sealed this
Fourth Day of February, 2020

Andrei Iancu
*Director of the United States Patent and Trademark Office*